United States Patent [19]

Powers et al.

[11] Patent Number: 4,700,899
[45] Date of Patent: Oct. 20, 1987

[54] CONTINUOUS VACUUM GRINDING METHOD AND APPARATUS

[75] Inventors: Richard G. Powers, Overland Park; Warren R. Schack, Leawood, both of Kans.; Lewis F. Alley, Kansas City, Mo.; James E. Anderson, Shawnee Mission, Kans.

[73] Assignee: Marlen Research Corporation, Overland Park, Kans.

[21] Appl. No.: 788,765

[22] Filed: Oct. 18, 1985

[51] Int. Cl.⁴ .................. B02C 18/22; B02C 18/30
[52] U.S. Cl. ......................................... 241/30; 99/472; 241/82.5; 241/DIG. 14; 426/486; 426/518
[58] Field of Search ............ 17/38, 39; 241/DIG. 14, 241/82.1–82.7, 30; 425/85, DIG. 60; 99/472; 426/486, 518

[56] References Cited

U.S. PATENT DOCUMENTS

| 2,617,460 | 11/1952 | Levit | 99/472 X |
| 3,879,000 | 4/1975 | Muller et al. | 241/DIG. 14 X |
| 4,097,962 | 7/1978 | Alley et al. | 17/39 |
| 4,479,614 | 10/1984 | Bernard | 241/82.2 |

FOREIGN PATENT DOCUMENTS

| 1285353 | 12/1968 | Fed. Rep. of Germany | 241/82.1 |
| 135856 | 6/1979 | Fed. Rep. of Germany | 241/82.1 |
| 609526 | 6/1978 | U.S.S.R. | 241/82.1 |

*Primary Examiner*—Mark Rosenbaum
*Attorney, Agent, or Firm*—Schmidt, Johnson, Hovey & Williams

[57] ABSTRACT

An improved method and apparatus for the continuous vacuum grinding of meat or other products is provided which permits continuous deaeration and grinding so as to materially enhance the organoleptic properties of final meat products such as sausages and the like. Broadly speaking, the apparatus of the invention includes a pumping apparatus together with a grinder and a closed conduit coupling the pump and grinder; deaeration apparatus is also provided which serves to evacuate the meat products prior to grinding, and the latter are maintained in that condition throughout the grinding operation. In preferred forms, use is made of a reciprocating piston-type pump together with remote, separately powered grinding apparatus. In this form of the invention, deaeration is accomplished by means of apertured pistons within the pumping unit which are operatively coupled to a vacuum pump or other suitable evacuating device.

4 Claims, 6 Drawing Figures

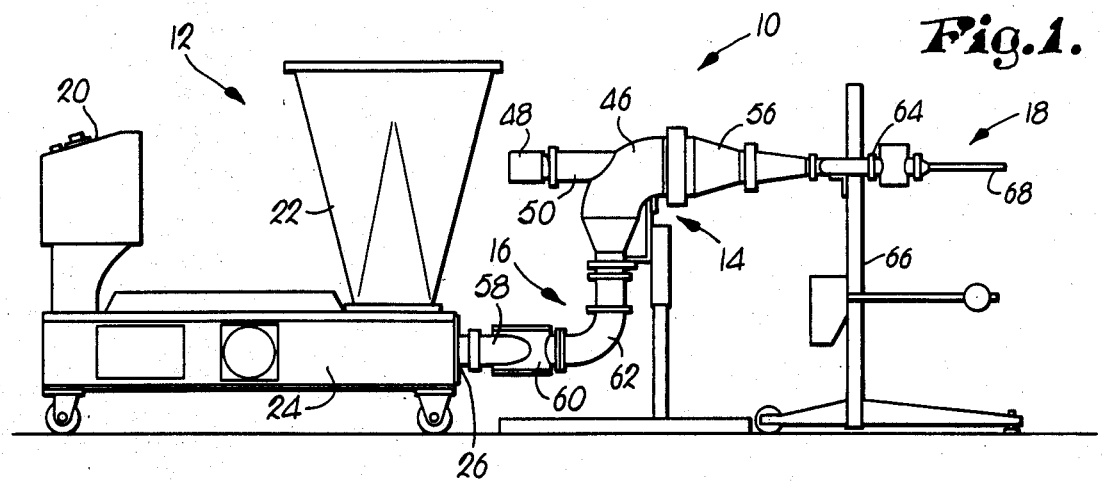
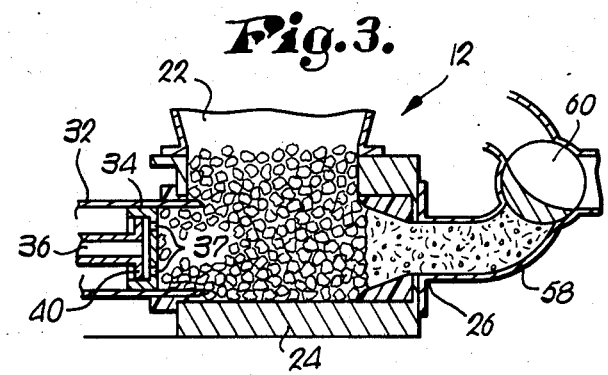
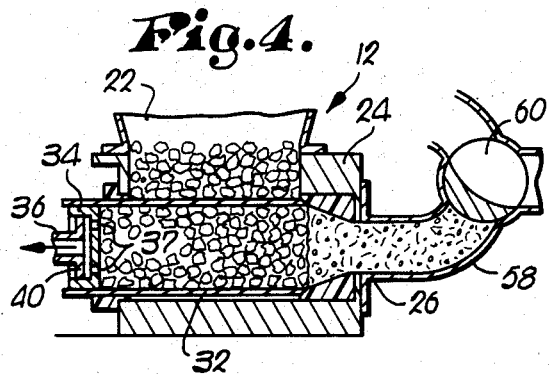
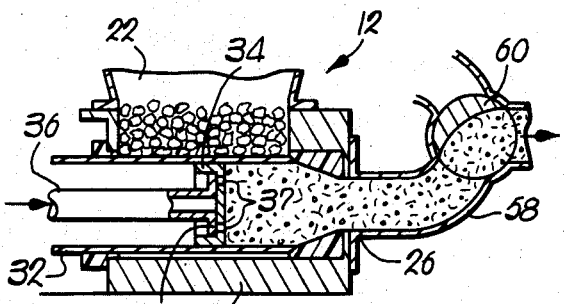
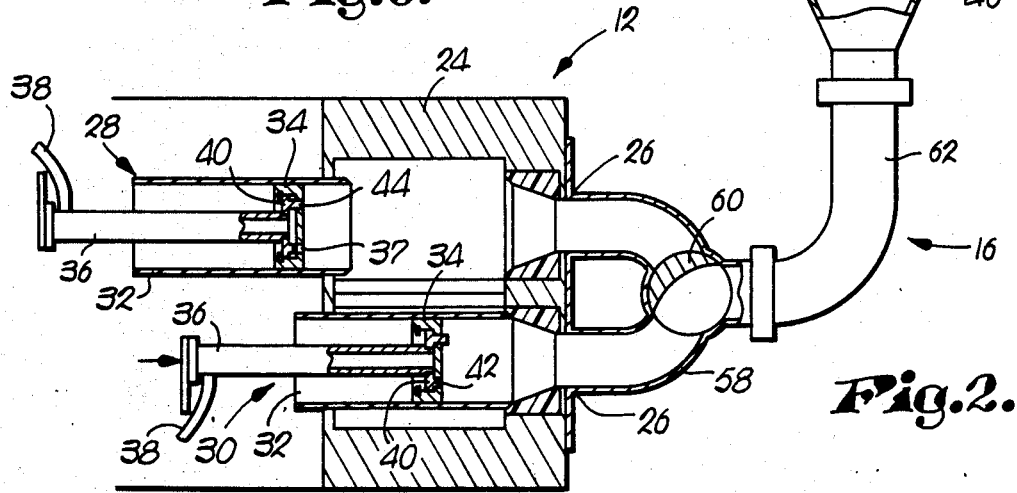

CONTINUOUS VACUUM GRINDING METHOD AND APPARATUS

BACKGROUND OF THE INVENTION

1. Field of the Invention

This invention relates to a method and apparatus for deaerating food in a continuous grinding operation to provide an anaerobic environment in the grinder and thus improve the organoleptic properties of the final ground food products.

2. Description of the Prior Art

In the manufacture of food items such as sausages or other meat products, the ultimate appearance or eye appeal of the products is of paramount importance. In sausages for example made up of ground or comminuted meats, processors go to great lengths to minimize the phenomenon of "smearing", or the loss of particulate identity in the products. By the same token, it is highly desirable to maintain a strong red meat color in many sausage products.

Previously, large batch-type vacuum choppers have been used in the meat industry. In practice, a charge of meat is placed within the tub of such a chopper, and the lid closed; a vacuum is then drawn to remove air, whereupon chopping knives within the tub are activated to cominute the meat. While these types of choppers are known, they are deficient in that they preclude continuous operations; moreover, the meat is necessarily subjected to the effects of air after the chopping step is completed as a result of unloading and subsequent handling.

In addition, many food products are graded or gradable according to bacteria count inasmuch as product quality and shelf life depend largely on the extent to which the bacteria is either killed or its growth prevented or reduced during processing and subsequent to marketing, prior to preparation for consumption. Many harmful microorganisms, especially bacteria, grow most rapidly in the presence of oxygen. Hence, whenever processing includes grinding of meats prior to packaging, the bacterial problem can be reduced quite substantially if air is removed before the product is introduced into the grinder.

U.S. Pat. No. 4,479,614 describes a highly advantageous grinding apparatus especially designed for use with a dual reciprocable piston pump of the type sold by the Marlen Research Corporation of Overland Park, Kans. The grinder device is operated via a separate motor and drive, and is operatively coupled to the pump through a valved conduit assembly. The dual piston Marlen pumps referred to above are designed to deliver a high pressure stream of food or other products, and it has been known in the past to equip such pumps with apertured pistons and air-conveying conduits so as to deaerate successive previously ground product charges prior to pumping. The '614 patent does not, however, suggest or intimate use of a deaerating piston pump in conjunction with a grinding device in order to achieve true continuous vacuum grinding.

Accordingly, there is a real and unsatisfied need in the art for a method and apparatus which permits continuous grinding of meat or other products under anaerobic conditions to improve the appearance and shelf-life qualities of final ground products.

SUMMARY OF THE INVENTION

According to the principles of the instant invention, therefore, in a process of continuously feeding particulate food products entrained with air from a dispenser to a grinder, there is introduced a step in the process which removes the air prior to introduction into the grinder and maintains such anaerobic conditions so that continuous grinding is carried out under optimum conditions.

Especially advantageous in the procedure is the fact that deaeration takes place continuously and automatically, without operator attention. Moreover, such improvements in the apparatus and method of the invention are of such nature as to create at least a partial vacuum, by use of an air pump or other artifical means, to exhaust to a high or the highest degree all the entrained air in the product while it is in the line between the dispenser and the grinder. Additionally, the air removal step is accomplished without any significant slow-down in the process which involves charging of the grinder with the product to be ground.

To these ends, the product is introduced into the grinder continuously in individual charges, so that the grinder can operate continuously. While each charge is so individualized, air is withdrawn therefrom. Then the deaerated charge is forced into the grinder in such manner as to prevent reaeration during each such force feeding step prior to actual reception of the batch in the grinder.

Advantageously, use is made of the abovedescribed dual piston pumping assembly commercialized by the Marlen Research Corportion of Overland Park, Kan. such device is of the type equipped with apparatus for deaerating successive charges of product as they are formed and expelled to the grinder. A closed conveying system between the pump and grinder assures that the desired anaerobic conditions are continuously maintained until the grinding step is completed.

IN THE DRAWINGS

FIG. 1 is a side elevational view of apparatus made pursuant to the present invention and having the capability of continuous vacuum grinding;

FIG. 2 is a fragmentary cross-sectional view of that portion of the apparatus which operates to charge and deaerate product, as well as feed the product charges to a grinder and thereupon grind the same;

Figure 6:

FIGS. 3-5 are fragmentary, schematic, detailed cross-sectional views illustrating the successive steps of charging, deaerating and force feeding a grinder with the particulated materials; and FIG. 6 is a view of a pair of containers of ground meat products after being formed into separate extrudates, illustrating the differences between deaerated grinding in accordance with the present invention, and conventional grinding.

DESCRIPTION OF THE PREFERRED EMBODIMENT

Turning now to the drawings, a continuous vacuum grinding apparatus 10 is illustrated in FIG. 1 and broadly includes a dual cylinder, reciprocal piston pump 12, a separately powered, continuous grinder 14, conduit structure broadly referred to by the numeral 16 operably interposed between the pump 12 and grinder 14, and a commercially available, dual horn stuffing apparatus 18 coupled to the outlet of grinder 14.

In more detail, the pump 12 is a commercially available unit made and sold by the Marlen Research Corporation of Overland Park, Kans. and includes a control console 20, infeed auger-hopper 22, a piston assembly housing 24 and a pair of outlets 26.

Referring to the schematic illustration of FIG. 2, it will be seen that a pair of piston and cylinder assemblies 28, 30 are housed within housing 24 and are operably communicated with the respective outlets 26. Each assembly 28, 30 is identical and includes a reciprocable, tubular sleeve 32, a reciprocable apertured piston 34 within the sleeve 32, and a tubular, rearwardly extending piston rod 36 secured to the piston 34. The assemblies 32, 34 reciprocate within a chamber of housing 24 communicating with hopper 22. In addition, a vacuum line 38 is coupled to the rearmost end of rod 36 and communicates with the tubular passageway defined by the latter.

Each piston 34 includes a plurality of evacuating apertures 37 therethrough. In addition, the forward end of rod 36 includes a radially extending plate 40 having pins 42 located for insertion within corresponding apertures 37 during operation of the assembly as will be described. Further, somewhat longer anti-rotation guide pins 44 are provided on piston 34 which reciprocate within appropriate piston apertures so as to prevent axial rotation of the piston during operation of pump 12. Reciprocal operation of the sleeves 32 and pistons 34 is accomplished by means of conventional hydraulic circuitry and need not be described in detail herein. Moreover, the overall pumping unit 12 is described in U.S. Pat. No. 4,097,962 and is more generally described in the aforementioned U.S. Pat. No. 4,479,614; both of these prior patents are incorporated by reference herein.

The grinder 14 includes an angled inlet housing 46 which supports a hydraulic motor 48 and knife drive 50. A multiple blade grinder knife 52 is affixed to the forward end of drive 50, and coacts with an apertured grinder plate 54. The overall grinder 14 further includes a frustoconical outlet housing 56 which leads to and communicates with the inlet of stuffer 18.

The conduit structure 16 includes a bifurcated, generally U-shaped conduit 58, the legs of which are respectively coupled to the outlets 26 (see FIG. 2). A shiftable diverter valve 60 is located at substantially the apex of conduit 58 for the purpose of alternately opening the legs of the latter. A transfer conduit 62 of smoothly arcuate design is coupled between the outlet of valve 60 and the inlet of housing 46 as can be readily appreciated from a study of FIG. 2.

The stuffer 18 is of conventional construction and includes a stuffing head 64 supported on an upright standard 66. The head 64 is in turn coupled to a pair of laterally spaced apart horns 68 which are adapted to receive casings during sausage filling operations.

In use meat or other product to be continually vacuum ground is introduced into hopper 22 whereupon it is augered into the described piston assembly chamber within housing 24. This condition is illustrated in FIG. 3, where it will be seen that one of the sleeves 32 is in its retracted position (the other sleeve not shown would be in its extended position and the piston associated therewith in its forward product delivery stroke). During retraction of the sleeve 32 to the FIG. 3 position, a vacuum is drawn through line 38 (there being a vacuum pump or other suitable structure, not shown, operably coupled with the line 38). Such is accomplished by virtue of the apertures 37 and tubular rod 36, permitting deaeration of the products.

Next, the sleeve 32 is shifted forwardly to its closed position shown in FIG. 4 so as to capture and entrap a charge of meat or other product. During this forward sleeve shifting, the vacuum conditions are maintained so as to assure full deaeration.

In the next step illustrated in FIG. 5, the vacuum is relieved and the piston rod 36 and piston 34 are moved forwardly so as to expel the charge of deaerated product out of pump 12 and into the associated leg of conduit 58. At this point the pins 42, 44 are moved forwardly into their associated piston apertures to clear the latter and block flow of meat into the vacuum line, and the piston forcibly expels the deaerated charge from the associated sleeve. During this sequence, the valve 60 is also shifted so as to open the associated leg of the conduit 58 to conduit 62, so as to define an open flow path for the deaerated product to grinder 14. During the foregoing operation (described with reference to FIG. 5), it will of course be understood that the adjacent piston assembly is operating in an alternative fashion, i.e., the sleeve 32 thereof is retracted and thence pushed forwardly to entrap a charge of product. In this fashion, the pump 12 operates in a batch-continuous manner, so as to continuously feed a stream of product to the grinder 14. In the latter connection, it will be observed that because of the completely closed nature of the overall system from pumping through the grinder 14, the product remains fully deaerated until it emerges from the stuffer 18 and is packaged.

Actual tests using apparatus as herein described have demonstrated that the continuous vacuum grinding affords substantial advantages in terms of organoleptic properties of the final products. To give but one example, attention is directed to FIG. 6, which is a comparative photograph of sausages produced in accordance with the present invention (upper half of photograph) versus a product made using conventional equipment but with the same starting materials. Specifically, both sausage products were made with meat consisting of 46.6 percent fat and 53.4 percent lean, reduced through a 5/32 diameter hole grinder plate. The product made in accordance with the present invention as shown in the upper half of the photograph employed a Marlen dual piston pump, together with the depicted grinder and dual horn stuffing unit illustrated in the drawing. On the other hand, the prior art product shown in the lower half of the photograph was produced using a commercially available Weiler grinder and a Handtman stuffing device.

As can be readily observed from the photograph, the product made by the present invention exhibited substantially more particulate identity, with a minimum of "smearing." When it is considered that both of the products included the same fat to lean ratio, it will be appreciated that the continuous vacuum grinding process of the invention materially enhances the desirable organoleptic properties of the final product.

In addition, the invention gives a better red meat color than previous methods, and moreover enhances the shelf life of the resultant products. The continuous grinding operation also allows easier density control and more sanitary operations because of the maintenance of deaerated conditions between pumping and grinding.

A wide variety of particle sizes can be used in the production of meat products using the method and apparatus of the invention. Generally speaking, the meat particles should range in size from about ⅛ inch up to about 3 inches, with lean particles being somewhat larger than fat particles. Generally, the meat should be refrigerated and below about 34° F.

While a primary utility for the invention is in the production of sausage products, those skilled in the art will recognize that it finds utility in chubb filling and other meat applications as well.

Finally, product densities can be increased by using the present invention inasmuch as air is removed prior to the grinding operation. That is to say, in conventional stuffing operations the meat is ground in air and free air thus becomes emulsified and trapped within the meat itself. This entrapped air is very difficult to remove and thus lowers the product density. However, the present invention removes air prior to the grinding step so that such free air has no opportunity to become entrained in the meat during grinding.

We claim:

1. In apparatus for grinding of products including a pumping means for delivering a stream of product to be ground, grinding means including an apertured grinder plate downstream of said pumping means for receiving said product stream and grinding the same, and conduit means operatively coupling the pumping means and grinding means, the improvement which comprises:

said pumping means including structure for forming a chamber which can be closed to the entrance of ambient air, means for substantially filling the chamber with meat, mechanical means for closing the meat-filled chamber to the entrance of ambient air and for isolating said chamber from said grinder plate, and means for removing entrapped air within the closed, meat-filled chamber; and said conduit means being imperforate for continuously maintaining said product in said deaerated condition until ground product is expelled from said grinding means.

2. The apparatus of claim 1, wherein said pumping means comprises a reciprocable piston pump, said air-removing means comprising structure defining an aperture through said piston, and means for withdrawing said air through said aperture.

3. The apparatus of claim 1, said pumping means comprising a pair of reciprocable pistons, and a reciprocable sleeve receiving each piston.

4. In a method of grinding a stream of meat including the steps of directing meat to pumping means, operating said pumping means to generate a stream of said meat therefrom, and grinding said meat in a grinder operatively coupled with the pumping means and having an apertured grinder plate, the improvement which comprises the steps of:

removing air from said meat prior to entrance thereof into said grinder, said air removal s tep comprising the steps of establishing a chamber closed to the entrance of ambient air within the pumping means and isolated from said apertured grinder plate, and simultaneously filling said chamber with meat, and removing air entrapped within said closed chamber; and continuously maintaining said meat in said deaerated condition until ground meat is expelled from said grinder.

* * * * *